Jan. 19, 1971 W. C. COOPER 3,555,940
GROOVING UNIT
Filed May 26, 1969

INVENTOR.
WILLIAM C. COOPER
BY
*Alford L. Truman Jr.*
ATTORNEY

3,555,940
Patented Jan. 19, 1971

3,555,940
GROOVING UNIT
William C. Cooper, Royal Oak, Mich., assignor to The Budd Company, Philadelphia, Pa., a corporation of Pennsylvania
Filed May 26, 1969, Ser. No. 827,642
Int. Cl. B23b 5/02
U.S. Cl. 82—2    6 Claims

ABSTRACT OF THE DISCLOSURE

A vertical nipper type grooving unit for attaching to a brake disk straddle facing machine to sequentially machine a precision groove on each face of a finished brake disk.

BACKGROUND OF THE INVENTION

A brake disk is generally formed with a relatively thin flange portion extending radially from a central hub or mounting portion. The axis of the disk is perpendicular to the faces of the flange portion and the faces of the flange portion are parallel. It has been found that the finish surfacing of these parallel faces is best accomplished if both faces are machined simultaneously so that the forces applied to the opposing faces off-set each other and do not impose a deflection of the disk that would off-set the perpendicularity thereof to the axis of the disk.

A machine designed for machining the faces of the flange portion of a brake disk provides a bearing cup for locating the brake disk and hub assembly and a driven shaft in alignment with the cup for rotating the brake disk and hub assembly. A pair of facing tools are moved across the opposite faces of the flange portion as the hub and disk are rotated for finishing the surfaces. A pair of horizontal slide bars support the facing tools for their reciprocating movement over the faces of the flange.

Prior to this invention, a second set of slide bars were required to move a set of grooving unit tools into position over the finished faces of the flange or a separate operation was required to produce the grooves. Care must be exercised in producing the groove so that the groove is concentric about the axis of rotation of the brake disk and the groove is a uniform depth below the surface of the flange face. An object of this invention is to provide a grooving tool that produces a groove meeting these requirements.

SUMMARY

The tool provided by this invention consists of a nipper type grooving unit for being attached to the reciprocating finish cutting head of the straddle facing machine. The control circuit for the facing machine being modified to provide a dwell period while the nipper cutting tool is moved into position, actuated to cut the groove in the finished face, and then retracted to the beginning position for the next cycle.

DESCRIPTION OF THE PREFERRED EMBODIMENT

Figure 1:
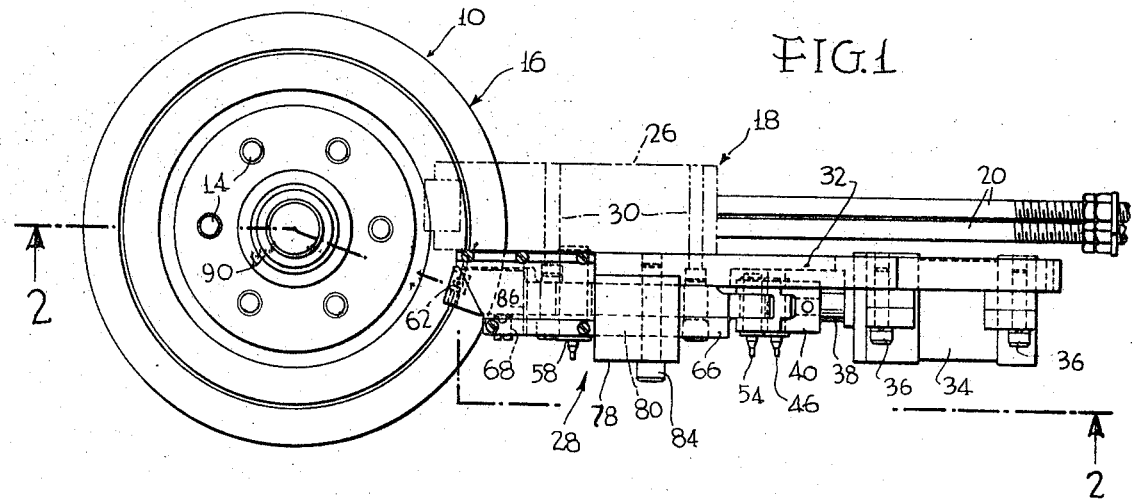
FIG. 1 is a plan view of the machine brake disk and grooving unit of this invention secured to the finish cutting head (shown in phantom lines) of a straddle facing machine with the groove cutters in the dwell or cutting position.
Figure 2:
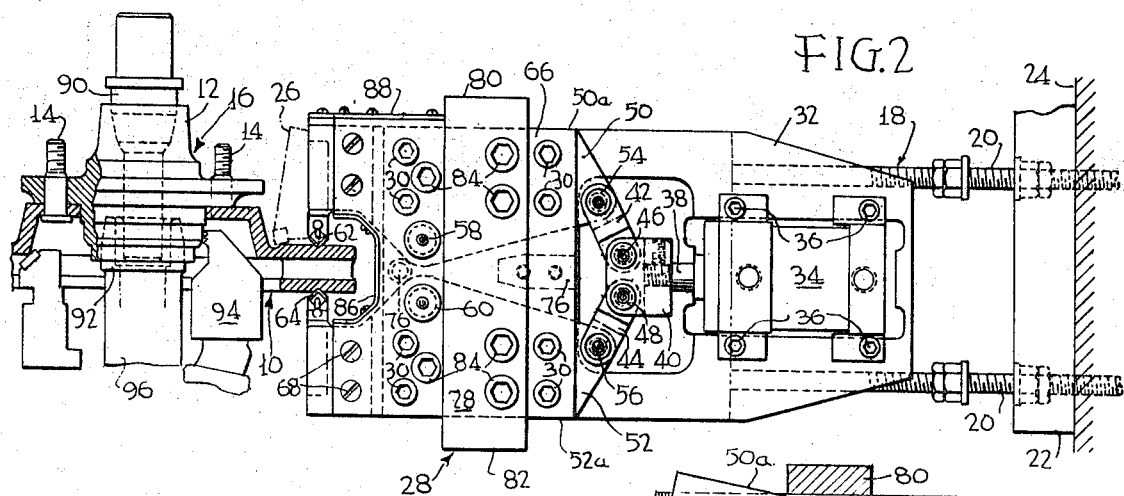
FIG. 2 is a view substantially along line 2—2 of FIG. 1, in the direction of the arrows, with sections broken away to show the grooving cutters in the cutting position.

Referring now to FIGS. 1 and 2, a brake disk 10 and wheel hub 12 assembled by a plurality of studs 14 to form a hub-disk assembly 16 are positioned in a straddle facing machine 18. In this particular application the wheel hub 12 and brake disk 10 are joined prior to machining; however, the brake disk 10 could be machined prior to assembly, if desired, by providing appropriate mounting means.

The straddle facing machine 18 includes a pair of trip rods 20 secured on a mounting plate 22 mounted on a supporting surface 24. A conventional finish cutting head 26, shown in phantom lines in FIG. 1, is supported on the trip rods 20 for reciprocal movement thereon, upon command. The grooving unit 28 is secured to the finish cutting head 26 by a plurality of bolts 30 for movement therewith.

The grooving unit includes a base plate 32 which is secured to the finish cutting head 26 by the bolts 30, and supports the grooving unit mechanism. A hydraulic actuating cylinder 34 is secured to the base plate 32 by a plurality of bolts 36. The piston rod 38 extending from the cylinder 34 is secured to a clevis 40. A pair of control links 42, 44 have one of their ends pivotally secured to the clevis 40 by a pair of pivot pins 46, 48 respectively. The other ends are pivotally secured to the respective tool holder arms 50, 52 by the pivot pins 54, 56, respectively. The tool holder arms 50, 52 are pivotally secured to the base plate 32 by pivot pins 58, 60, respectively for pivotally moving the respective tool bits 62, 64 into cutting contact with the rotating brake disk 10 and away from the brake disk when the groove has been completed.

A retainer plate 66 holds the tool holder arms 50, 52 in sliding engagement with the base plate 32 and includes a plurality of ball bearing units 68 for providing rolling engagement with the tool holder arms 52 while holding them against the base plate 32. The retainer plate 66 is secured to the base plate 32 by a plurality of bolts 70, 72. The bolts 70 have clearance holes 74 in the tool holder arms 50, 52 to permit movement thereof without blockage by the bolts 70 and the bolts 72 have spacer sleeves 76 to prevent the retainer plate 66 being tightened too tightly against the base plate 32 and binding the tool holder arms 50, 52 therebetween, thus preventing their movement.

Figures 3, 4:
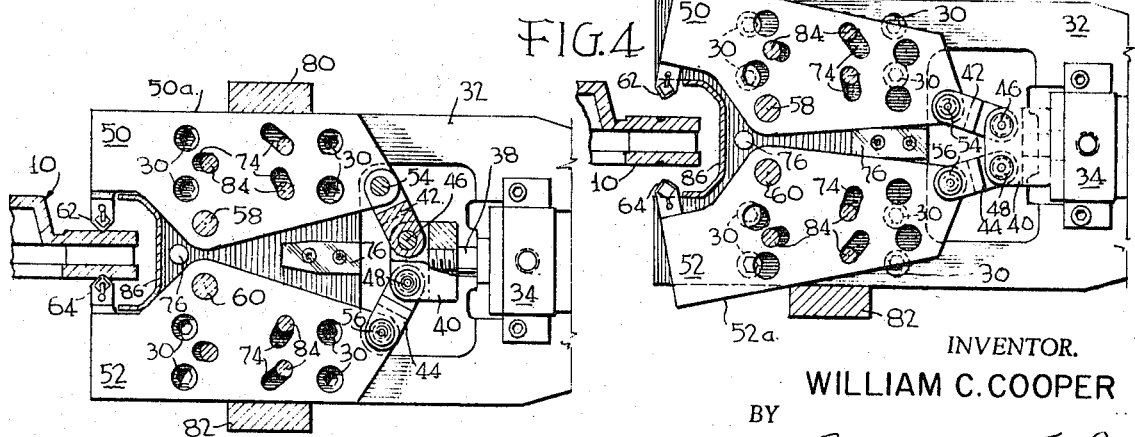
FIG. 3 is a view of a portion of FIG. 2 with parts removed and broken away to illustrate the position of the parts in the cutting position.
FIG. 4 is the same view as FIG. 3 with the parts in the retracted position.

A generally U-shaped stop bar 78 is positioned over the retainer plate 66 with arms 80, 82 extending along the edge of the retainer plate toward the base plate 32. The stop bar 78 is secured to the base plate 32 by the bolts 84 that extend through the retainer plate 66 and through the clearance holes 74 in the tool holder arms 50, 52 into threadable engagement with the base plate, as best seen in FIGS. 3 and 4. The stop arms 80, 82 contact the outer edges 50a, 52a of the tool holder arms 50, 52 to limit the pivotal movement thereof as will be explained later.

The throat shield 86 and side shield 88 are secured to the retainer plate 66 by metal screws or other suitable means to prevent chips and other dirt from clogging and blocking the sliding of the tool holder arms 50, 52.

The hub-disk assembly 16 is located for rotation by an upper bearing cup 90 and a lower bearing cup 92. The hub 12 is secured by chuck jaws 94 that are secured to the drive shaft 96 for rotation therewith. The drive shaft 96 is driven by a power source (not shown) to rotate the hub-disk assembly 16 for the disk preparation.

In the operation of the finishing unit, the hub-disk assembly 16 is positioned between the bearing cups 90, 92. As the hub-disk assembly is rotated, the machine is cycled through the rough cutting cycle and finishing cycle. When the finish cutting head 26 reaches the position shown in phantom lines in FIG. 2, the grooving cycle is actuated.

In the grooving cycle, the hydraulic cylinder 34 is actuated to move the clevis 40 toward the brake disk 10 from the position shown in FIG. 4 to the position shown in FIG. 3. Such movement of the clevis 40 causes the one end of the links 42, 44 to pivot about their respective pivot pins 46, 48 and the other end pivots about the pivot pins 54, 56 and causes the tool holder arms 50, 52 to pivot about the respective pivot pins 58, 60 until their outer edges 50a, 52a contact the stop arms 80, 82 stopping further movement of the linkages. As the tool holder arms 50, 52 are thus rotated about the pivot pins 58, 60, the tool bits 62, 64 mounted thereon are moved from their position shown in FIG. 4 to the cutting position shown in FIG. 3. The cycle may be timed for holding the cutting position of FIG. 3 for at least two revolutions of the brake disk or by a pressure switch connected to the hydraulic cylinder fluid system that would be actuated by a pressure build-up when further movement of the linkage system is halted by the stop arms 80, 82. When the groove is completed, the flow of the pressurized fluid in the hydraulic cylinder is reversed and the movement of the linkage system is reversed to move the tool bits and tool holder arms to the retracted position shown in FIG. 4 to complete the grooving cycle.

I claim:

1. In combination a movable finishing apparatus for simultaneously finish surfacing both surfaces of a rotating brake disk and a grooving unit attached to said movable finishing apparatus for movement therewith, said grooving unit having a normal retracted position and a cutting position and being movable therebetween, said grooving unit including a pair of tool bits for simultaneously engaging and cutting a groove in each of the opposed faces of the rotating brake disk, an actuating means for moving said groove cutting tools between said positions, linkage means operably connecting said tool bits with said actuating means, control means for controlling movement of said actuating means, and a base plate secured to said finishing apparatus for supporting said grooving unit.

2. The grooving unit as claimed in claim 1 wherein said actuating means includes a hydraulically powered reciprocating piston in a cylinder secured to said base plate and a clevis secured to said piston for movement therewith, said clevis having a pair of pivotal connections thereon for operably connecting said actuating means to said linkage means.

3. The grooving unit as claimed in claim 2 wherein said linkage means includes a first and a second tool holder arms, each of said tool holder arms having pivotal connection securing them to said base plate, one of said tool bits secured to each of said tool holder arms for pivotal movement therewith between said retracted position and said cutting position wherein said tool bits engage the rotating brake disk, a first link having one end pivotally connected to said first tool holder arm and the other end pivotally connected to one of said pivotal connections on said clevis, a second link having one end pivotally connected to said second tool holder arm and the other end pivotally connected to the other of said pivotal connections on said clevis whereby movement of the piston in the cylinder of the actuating means causes the tool bits to be moved into and from engagement with the rotating brake disk by the pivotal movement of the tool holder arms about their pivotal connections as caused by the link pivotally connected thereto and to the clevis.

4. The grooving unit as claimed in claim 2 wherein said control means controls the movement of fluid under pressure to said hydraulic cylinder and piston for moving said piston through a complete cycle when said finishing apparatus has completed the finish cut of the rotating brake disk.

5. The grooving unit as claimed in claim 1 including stop means for limiting the movement of said linkage means at a predetermined cutting position.

6. In combination a straddle surfacing machine having a fixture for orientating a brake disk relative to a reference axis of rotation thereof determined by axially spaced bearing cups engaging a hub portion for supporting an annular flange portion extending radially from the hub portion, means for locating and securing said brake disk therein for rotation therewith, and power means for rotating said fixture and said brake disk during surfacing of the parallel braking faces of the flange portion; a rough cutting apparatus for simultaneously engaging and rough surfacing the braking surfaces of said flange portion, a finish cutting apparatus for simultaneously engaging and finish surfacing the braking surfaces of said flange portion and a grooving unit for simultaneously engaging and cutting a groove in each surface of said flange portion; said grooving unit including a base plate for supporting said grooving apparatus, a reciprocating actuator means secured to said base plate for moving on command said grooving apparatus between a cutting position in engagement with said rotating brake disk and a retracted position out of engagement with said brake disk, a clevis secured to said actuator means for movement therewith, said clevis having a pair of pivot pins secured thereto, a first link having one end pivotally secured to one of said pivot pins, a second link having one end pivotally secured to the other of said pivot pins, a first tool holder arm having a pivotal connection to said base plate and a pivot pin secured thereto for pivotally connecting the other end of said first link to said first tool holder arm, a second tool holder arm having a pivotal connection to said base plate and a pivot pin secured thereto for pivotally connecting the other end of said second link to said second tool holder arm, a tool bit secured on each tool holder arm for cuttingly engaging said brake disk in said cutting position and stop means for limiting pivotal movement of said tool holder arms in one direction at the cutting position.

References Cited
UNITED STATES PATENTS

| | | | |
|---|---|---|---|
| 2,734,255 | 2/1956 | Tack | 82—4X |
| 3,442,164 | 5/1969 | Blazer | 82—2 |
| 3,483,775 | 12/1969 | Van Someren et al. | 82—2 |

LEONIDAS VLACHOS, Primary Examiner

U.S. Cl. X.R.

82—4